June 4, 1957　　　A. D. MORTON ET AL　　2,794,233
METHOD OF AND APPARATUS FOR MOLDING CAVITIES
IN SETTABLE MOLDING MATERIAL Filed March 24, 1954　　　3 Sheets-Sheet 1

INVENTORS
ALDEN D. MORTON AND
PAUL H. VECCHIOLLA
BY Roy F. Stewart
ATTORNEY

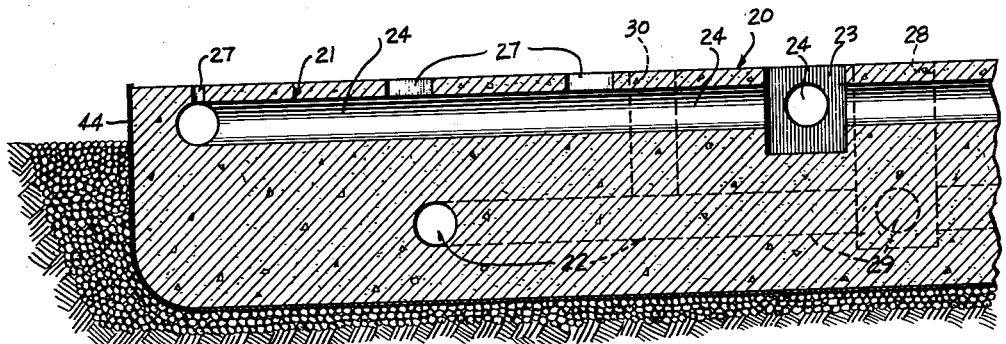
Fig. 2
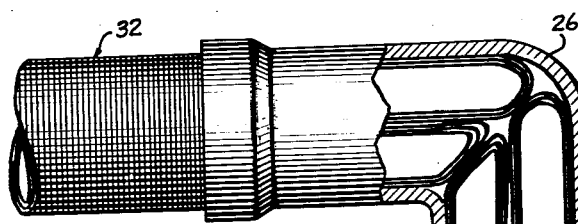
Fig. 9
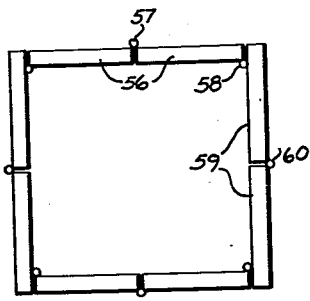
Fig. 10
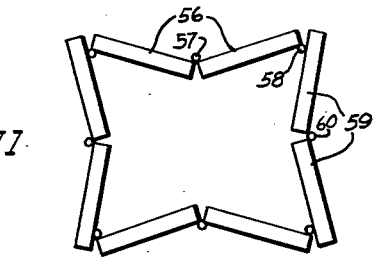
Fig. 11
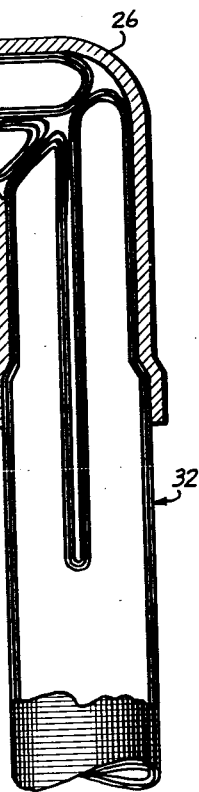
INVENTORS
ALDEN D. MORTON AND
PAUL H. VECCHIOLLA
BY Roy F. Steward
ATTORNEY June 4, 1957    A. D. MORTON ET AL    2,794,233
METHOD OF AND APPARATUS FOR MOLDING CAVITIES
IN SETTABLE MOLDING MATERIAL
Filed March 24, 1954    3 Sheets-Sheet 3
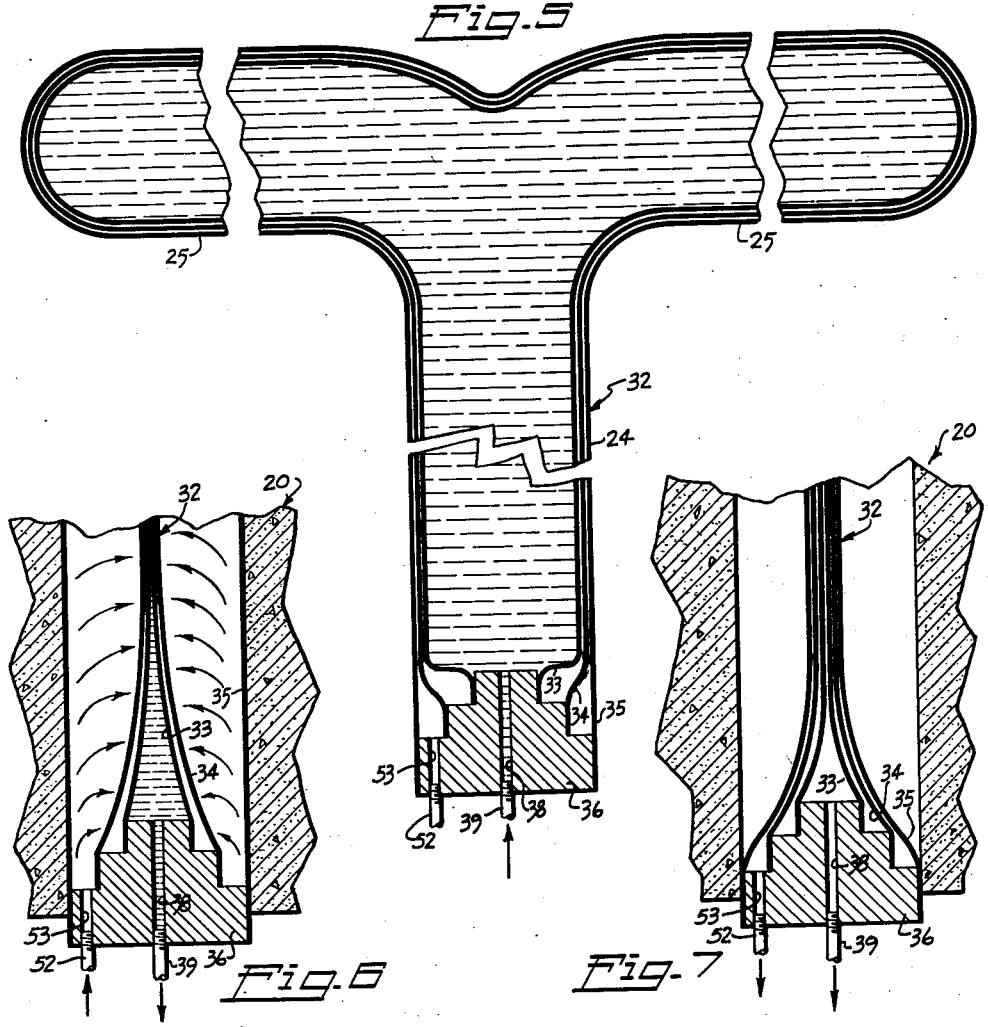
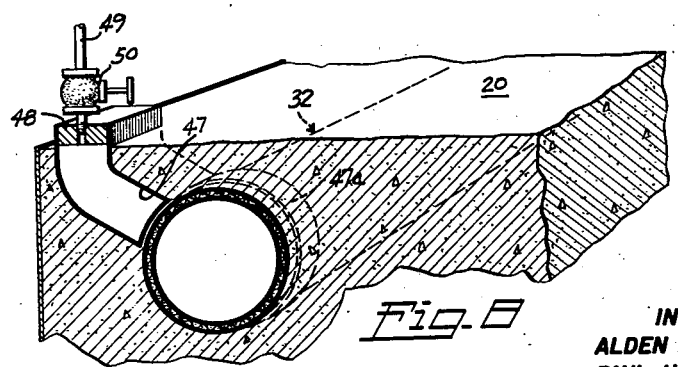
INVENTORS
ALDEN D. MORTON AND
PAUL H. VECCHIOLLA
BY Roy F. Steward
ATTORNEY United States Patent Office 2,794,233
Patented June 4, 1957

2,794,233

METHOD OF AND APPARATUS FOR MOLDING CAVITIES IN SETTABLE MOLDING MATERIAL

Alden D. Morton, Hartford, and Paul H. Vecchiolla, East Hartford, Conn.

Application March 24, 1954, Serial No. 418,376

11 Claims. (Cl. 25—128)

This invention relates to a method of and apparatus for molding cavities in settable molding material. It is particularly applicable to the molding of cavities such as ducts of substantial length in a concrete mass, for example in the so-called slab type of flooring commonly used in housing construction. In such use the ducts serve generally as conduits for the heating and ventilating system of the house, but may also be employed as conduits for electrical cable, water or gas pipe, and the like. The invention is useful also in other applications, as in the construction of septic tanks directly in place in the ground, and a jointless conduit leading from a floor slab to the tank, the conduit likewise being constructed in place, to provide a completely integral system.

Various methods have previously been used to form conduits integrally in a mass of molding material, for purposes similar to those mentioned above, and it is an object of this invention to overcome some of the difficuties which have been encountered in those methods. For example, it has been the practice in many instances to use forms either of wood or metal which are left permanently embedded in the concrete, which is the material most generally employed. The duct form is in such instances simply left to rot or rust away, with the result that whenever a draft of air is forced through the ducts by the heating system after the house has been built, dust or rust for some time thereafter will be blown out into the rooms of the house and deposited upon the walls, ceilings, furniture, etc., much to the consternation of the housewife. To avoid this, forms which are removable after the concrete has set have been tried. The chief problem with these heretofore has been in effecting separation of the mold form from the concrete after it has acquired a permanent set or is at least sufficiently set to be self-supporting. This becomes an increasingly difficult problem with increase in the length of the ducts, and with the number of turns or bends which they are required to undergo. Prior methods are accordingly limited in most instances to applications requiring only relatively straight runs of short extent, and the practical utilization of those methods is accordingly substantially limited.

The invention here disclosed comprises in general the use of an expansible or inflatable mold or form of suitable cross sectional dimension and length to provide the desired cavity in the moldable material. As mentioned above, expansible forms of various types have been tried with more or less success for this purpose for a long time, but the type here disclosed, and the method of using it are particularly effective in that they permit the simultaneous formation of ducts of greater length and of more circuitous path than has been generally possible heretofore. The inflatable form employed is of multiple walled, flexible construction, and it is a particular feature of the novel form or mold, and the manner of using it, that liquids or gases may be introduced between the walls as well as interiorly of the innermost wall or core thereof. As will appear hereinafter, this arrangement is responsible in large part for the increased ease with which the form may be removed from the duct or other cavity formed in the concrete or similar moldable material.

It is also an object of the invention to provide a form or mold of the type under discussion which may be manufactured in a single, standard, maximum required length but which can be readily shortened temporarily as needed to meet any given set of conditions. At the same time, it is desirable to substantially eliminate any variation, especially in cross-sectional dimension, of resulting ducts. Owing to inadvertent concentrations of concrete at a point along the form, which tends to cause a constriction of that point and a bulging at some other point, such variations are a source of trouble, and it is a further object of this invention to provide a means for overcoming this difficulty.

In the case of heating and ventilating ducts, provision must be made in the slab flooring of the house for connection to the duct of a floor or wall register, and for a plenum chamber to which the furnace or air conditioning unit is to be attached to deliver heated or cooled air to the ducts. In both instances, the invention here disclosed affords a simple and effective method of providing such outlets or access openings in the concrete simultaneously with the forming of the ducts themselves.

Various other objects and advantages of the invention will appear from the detailed description which follows of a mold or form, and the method of using it, for casting a concrete floor slab for a dwelling house in which a perimeter heating and ventilating system is to be installed.

The use of slab flooring of poured concrete or the like for a foundation for a house has certain obvious advantages, particularly from the economical standpoint, and is accordingly widely used by builders where weather conditions, building codes and various other considerations permit. It has likewise been recognized for some time that it would be highly desirable to provide an integral duct system in a floor slab of this type for the heating and ventilating conduits in a house, and thus realize a further economy in construction. For various reasons a system of heat distribution known as "perimeter heating" is one of the most desirable methods of distribution. The specific example here illustrated and described relates to such a system.

In the drawings,

Fig. 2 is a sectional view in elevation on line 2—2 of Fig. 1;

Fig. 3 is a cross-sectional view in elevation taken on line 3—3 of Fig. 1 showing an inflated duct form embedded in concrete, and one means of forming a register access opening in communication with the duct;

Fig. 4 is a fragmentary sectional view in perspective of the terminus of a duct form;

Fig. 5 is a broken plan view of a T-shaped inflated form;

Fig. 6 is a fragmentary view of the form in which air has been introduced between the center and outermost sleeves to expel the water from the innermost sleeve;

Fig. 7 is a view similar to Fig. 6 except that suction has been applied to the form to cause it to collapse inwardly away from the walls of the duct formed in the concrete for removal from the duct thus formed;

Fig. 8 shows a modified arrangement for forming an access hole in the concrete slab for connecting a register to the duct;

Fig. 9 is a fragmentary plan view, partly in section, showing the end of the duct forms foreshortened by being turned inwardly upon themselves, and intersecting in an elbow to provide a continuous duct having a right angled bend;

Fig. 10 is a plan view of a plenum chamber form useful in conjunction with the inflatable forms; and Fig. 11 is a view of the plenum chamber form partially collapsed to permit its removal from the access hole formed in the concrete.

Figure 1:
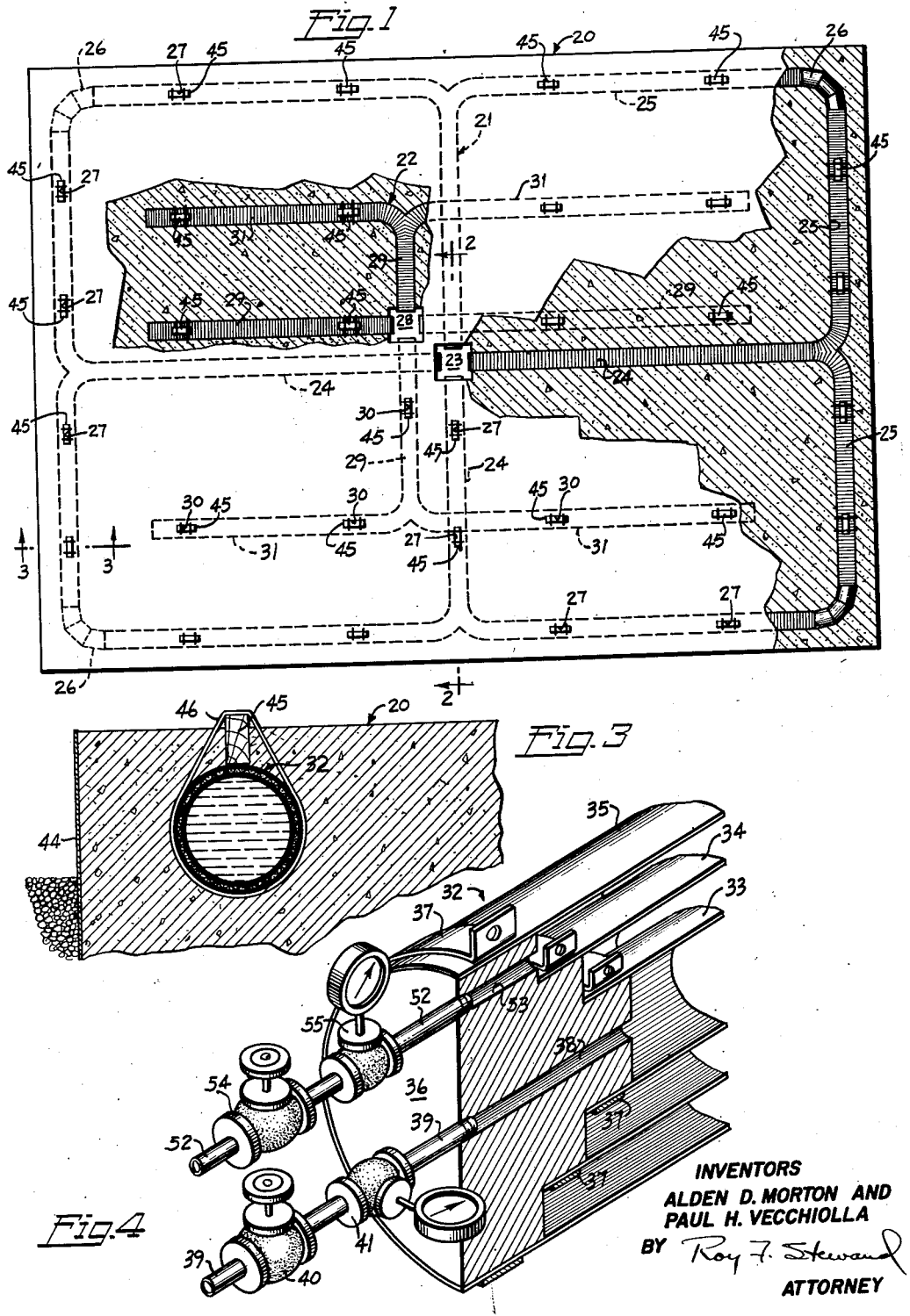
Fig. 1 is a plan view, partly in section, of a concrete floor slab, with the duct forms in place to provide a complete perimeter heating and ventilating duct system.

Referring more especially to Figs. 1 and 2 of the drawings there is shown a poured concrete slab 20 suitable for a house foundation and incorporating integral heating and ventilating ducts. The system illustrated in the drawings comprises two separate networks of ducts, one being the distribution system 21, the other being the return system 22. The distribution system comprises a plenum chamber 23 here shown as being centrally located on the concrete slab 20. Radiating outwardly from this chamber are ducts 24 which branch or fork outwardly adjacent the sides of the concrete slab to provide legs 25 which extend along the sides of slab 20 generally parallel thereto and spaced inwardly therefrom a short distance. The outer end of each of these legs is joined to the adjacent outer end of another leg by means of an elbow 26 so as to provide a continuous path through the ducts completely around the slab 20. The distribution duct system 21 is provided with outlets or access openings 27 spaced along the duct system as required by the arrangement of the rooms into which the floor slab is to be divided. Thus conditioned air, that is either heated or cooled as may be required, blown downwardly into the plenum 23 is distributed throughout the system and emerges at the outlets 27. These are normally provided with individual dampers to control the output into any particular part of the house. The system just described is here shown as being continuous in that the outer ends of legs 25 are joined at elbows 26. Obviously, however, junction of the outer ends need not occur although it is preferred for reasons of better distribution. Similarly, the return duct system 22 comprises a plenum chamber 28 located adjacent plenum 23, and ducts 29 radiate outwardly from this chamber to the desired points on the floor slab and are provided with intake openings 30 spaced along their extent as required. In the system illustrated in Fig. 1, two of the legs 29 are shown as being of straight extent only, while the other two legs are forked to provide oppositely extending lateral legs 31. Various combinations can of course be employed to provide the necessary distribution of the intake openings 30, and the system could of course be arranged to be peripherally continuous as in the case of the distribution system shown. Thus, when the intake of a fan or blower is connected to plenum chamber 28, air is brought in through the openings 30 and the air is then re-heated or re-cooled as desired for redistribution. Again, dampers in the registers connected to the access openings 30 or in the openings themselves may be used to provide individual control of the air intake at any one point. As will be seen more particularly in Fig. 2, the return system 22 is disposed in slab 20 below the distribution system 21 so that intersection of the distribution and return ducts is avoided. Obviously the relationship of these two systems could be reversed but the system here shown is preferred inasmuch as it places the ducts of the distribution system closest to the surface of the slab which thus causes the greater portion of any incidental heat tarnsfer to take place into or out of the room directly above these ducts, rather than downwardly into the ground where it would be wasted.

In forming the duct system just described, there is employed a form or mold 32 which is shown more particularly in Figs. 3 through 7. As will be seen from Figs. 4 and 5, more especially, the form is of multi-walled construction, comprising an inner sleeve 33 of rubber or other elastic material, an intermediate sleeve 34 of flexible but non-elastic material, and an outer sleeve 35 also of flexible material and which in the example here shown is also elastic. These sleeves are closed at one end, and at their opposite end are connected to a stepped plug 36 by means of ring clamps 37 to provide a tight seal between the respective sleeves and the stepped surfaces of the plug 36. When in use, form 32 is inflated by pumping water or other suitable liquid into the inner sleeve 33 through a tube or passage 38 passing substantially axially through the plug 36. Water under pressure is supplied to the feed pipe 39 which is threaded into the passage 38 and a valve 40 is provided to control the admission of the water. There is also provided in the feed pipe 39 a pressure gauge 41 to assist in controlling the inflation of the form 32 to the proper extent. As shown more particularly in Fig. 5 water is forced into the form until the inner sleeve 33 expands to the limit permitted by the non-elastic intermediate sleeve 34, in which condition the form 32 assumes a smooth, cylindrical outer surface, the diameter being that of the duct which it is desired to form in the concrete. The particular form 32 illustrated in Fig. 5 is shown as being T-shaped, but it is apparent that the form may be simply a straight run or it may be in the form of an L, a Y, or the like.

In the specific example here illustrated, the floor area is first covered with the usual gravel fill and a moisture barrier 44 (Fig. 3) is then laid over this. The duct forms for the return system 22 are then laid out on the floor area in the desired position, as for example in the manner shown in Fig. 1, and the terminal portions or plugged ends are inserted through closely fitting apertures in a rectangular mold or form (see Figs. 10 and 11) which is used to define the plenum chambers 28. A similar plenum chamber form 42 is employed for the distribution system but inasmuch as the return system is disposed in a plane below that of the distribution system 21, form 43 must be somewhat deeper than that for defining the chamber 23. By passing the terminal portions of the inflatable duct forms 32 through apertures in the plenum forms 42 or 43, access may be had to those ends of the forms to control the deflation thereof and to permit their subsequent removal. The ducts are then inflated by pumping in water to expand them to their maximum diameter and concrete is poured over and around them so as to completely embed them in the mass. Since the inflated forms are filled with water, they are sufficiently heavy to prevent any great tendency to rise in the mass of wet concrete. However, the specific gravity of the forms is not so different from that of the concrete that some floating or rising of the forms may not occur and this is desired to a certain extent in order to assist in getting a layer of concrete below the forms as well as above them to ensure that they are effectively surrounded. When the foregoing has been accomplished, the forms for the distribution system are laid in place and inflated, and additional concrete is then poured in on top to embed this system in the slab.

The inclusion in the duct form 32 of a flexible but substantially non-elastic sleeve, such as sleeve 34 in the present example, is important. Being non-elastic, it limits the maximum amount of inflation of the central core or sleeve 33 and thus prevents the formation of bulges or "bubbles" in the elastic core. These tend to form owing to slight variations in wall thickness in the elastic tube which make some parts of the tube harder to inflate than others. Without this non-elastic sleeve, uneven inflation occurs and the resulting duct formed in the concrete is accordingly of non-uniform cross section.

Where, as in the case of the distribution system 21, the outer ends of adjacent duct legs are joined so as to form a continuous or closed-circuit system, a coupling is provided which is left permanently embedded in the concrete. In the example shown these couplings are elbows 26. Ceramic tile of suitable diameter may be used here for this purpose. Sheet metal stove pipe can also be used and while this will rust out after a while, the amount of the metal pipe thus used is so small as to introduce no problem.

In each of the foregoing instances the respective forms 32 are provided at selected points along their lengths with auxiliary forms to provide the access openings for the attachment of distribution or return registers to the respective ducts. In the example illustrated in Fig. 3, these auxiliary forms are composed of blocks of wood 45 of desired length and width which are temporarily secured in place on the form 32 by means of straps 46. These encircle the form and pass over the upper surface of the blocks 45 to hold them securely in position. Each block 45 is of sufficient vertical dimension to allow a portion of it to extend above the upper surface of the floor slab so that it may be readily removed after the concrete has set. Other arrangements for removal of the blocks after the concrete has set can of course be used. In the case of the access openings for the return duct system 22, forms of greater length than those for the distribution system are required, inasmuch as the return system is located a greater distance below the surface of the slab. While it is possible to use the same type of wooden block as that discussed above, it is preferable here to use an inflatable form. Such a form is illustrated in Fig. 8. It comprises an inflatable, L-shaped form 47 having a rectangular end plug 48 through which water or other liquid may be introduced from a suitable supply pipe 49 under the control of a valve 50. The opposite end of the form 47 is contoured to fit the periphery of duct 32 and is temporarily held in abutment therewith by straps 47a while the concrete is poured in around the duct form 32 and the form 47.

After the concrete has set, or at least has set sufficiently to be self-sustaining, the valves 40 of the main ducts 32, and valve 50 of the auxiliary duct forms 47, are opened to permit the water to escape. Because of the short length of duct forms 47, water in them may be easily sucked out and the forms collapsed by connecting pipe 49 to the intake of a pump. Straps 47a may be pulled loose from the periphery of the main duct after the duct form 32 is removed, to completely free form 47. In order to completely expel the water from the inner sleeve 33 of the main ducts 32, however, air under pressure is introduced from an air feed pipe 52 to a passage 53 in plug 36 which opens upon the annular space between the intermediate sleeve 34 and the outer sleeve 35 of the form 32. A valve 54 and a pressure gauge 55 permit control of the air admitted to expel the water in the inner sleeve 33. Introduction of the air in this manner causes the collapse of the intermediate sleeve 34 against the inner sleeve 33 which thus forces substantially all of the water out of the inner sleeve throughout its length. This prevents a collapse of the sleeve at some point intermediate its length, resulting in a constriction at that point which would block off the water behind it and prevent its escape. This condition is prone to arise in sleeves of substantial length where it is attempted to evacuate the sleeve simply by applying suction at one end.

After the air has been introduced to force out the water, as illustrated in Fig. 6 in the drawings, and all the water that can be expelled in this manner has been allowed to flow out of the passage 38, both passages 38 and 53 are connected through their respective supply pipes to a source of suction so as to exhaust the air from the form 32. It will be apparent of course that since sleeves 33 and 34 have already been substantially completely collapsed by the previous introduction of air under pressure between the outermost and the intermediate sleeve, application of the suction to the passage 53 alone may be sufficient to accomplish the desired result, however it is preferred to apply the vacuum to both passages, as stated above. With the application of suction as stated, the outermost wall 35 is also then caused to collapse inwardly against the already substantially completely collapsed sleeve 34. In so doing, it is pulled away from the surface of the conduit or duct thus formed in the concrete. The form then may be easily withdrawn from the duct by pulling it out through the plenum opening. Prior to this last step, of course, the auxiliary access forms are freed from the form 32 by clipping the straps 46 flush with the upper surface of the floor and then prying out the blocks 45. In the case of the inflated auxiliary forms 47, these are deflated and are then pulled axially out of the access holes thus formed in the concrete slab.

As has been mentioned above, it is desirable to provide the duct forms 32 in standard lengths so that they will fit the largest installation normally contemplated. In order to use such standard length forms where the total length of one or more legs 25 or 31 is not required, for example, the closed end of the sleeves are turned in upon themselves as if to turn them inside out, until the desired effective leg length is obtained. This is illustrated in Fig. 9 of the drawings in which adjacent ends of duct forms 32 have been turned in upon themselves and then introduced into the ends of an elbow 26. Abutment of the ends of the adjacent duct form legs within the elbow, prevents the turned-in ends from being turned out again upon inflation of the form. On the other hand if the main leg, such as either leg 24 or 29 in Fig. 1, is longer than required, it is simply allowed to extend out of the plenum opening to whatever extent is necessary.

As an adjunct to the method of forming integral ducts described here, a simple type of plenum chamber form for use in forming the plenum opening, is illustrated in Figs. 10 and 11. This comprises a collapsible wooden form having sidewalls 56 each hinged at their midpoints by hinges 57 and at their outer ends by hinges 58 which secure them to end walls 59. The end walls are likewise hinged at their midpoints by hinges 60. By means of this arrangement, the walls of the form may be collapsed inwardly towards each other, as indicated more particularly in Fig. 11, so that after the concrete has set, the form may be easily removed from the access hole which it has formed in the concrete slab by withdrawing it vertically therefrom.

What is claimed is:

1. The process of molding cavities in a settable molding material which comprises placing in position to be covered by said molding material a cavity-forming inflatable form having a terminal portion for the application thereat of fluid pressures to inflate and deflate said form, said form having an expansible central sleeve and at least one surrounding flexible but non-elastic sleeve defining the maximum inflation permitted to said expansible sleeve, introducing at the terminal portion of said form a fluid under pressure to inflate said expansible sleeve to the maximum extent permitted by said non-elastic sleeve, applying molding material about said form to embed the latter while permitting the terminal portion thereof to extend out of said material, allowing the mass to set while the form is still expanded, releasing the fluid in said expansible sleeve and forcibly expelling the same by introduction of a gas under pressure between said expansible sleeve and a surrounding sleeve, releasing said gas pressure and applying a suction to completely collapse said form, and then withdrawing said form from the cavity thus formed in said molding material.

2. The process as defined in claim 1 wherein said inflatable form comprises an expansible central sleeve, a flexible but non-elastic sleeve immediately surrounding said central sleeve and an outer protective sleeve of flexible material; said gas-pressure being applied, after said molding material has set, between said non-elastic intermediate sleeve and said outer protective sleeve to expel the fluid from said central sleeve by collapsing the same, and thereafter applying suction between said intermediate sleeve and said outer protective sleeve to completely collapse said form.

3. The process of molding a cavity in settable molding material which comprises placing in position to be covered by said material a cavity-forming inflatable form having a terminal portion through which fluids may be passed for inflating and deflating said form, said form having a central sleeve and at least one surrounding flexible sleeve, at least one of the sleeves being non-elastic, introducing into a first sleeve a liquid under pressure to inflate said form to the maximum extent permitted by said non-elastic sleeve, embedding said inflated form in a mass of said molding material while maintaining at least said terminal portion uncovered, allowing said mass to set while said form is still inflated, releasing said liquid and applying a gas under pressure to the interior of a second sleeve to forcibly expel the liquid from said first sleeve, releasing said gas and applying a suction to the interior of said sleeves to collapse said form, and withdrawing said form from the cavity thus formed in said mass of material.

4. The process of forming integral ducts in a concrete floor slab which comprises placing in position to be covered by said concrete a duct-forming inflatable form having a terminal portion through which fluids may be passed for inflating and deflating said form, said form comprising tubular, substantially concentric flexible sleeves, at least one of which is substantially non-elastic, introducing into an inner sleeve of said form a liquid under pressure to inflate said form to the maximum extent permitted by the non-elastic sleeve, embedding said inflated form in a mass of concrete while allowing at least said terminal portion to remain uncovered, permitting said mass to become set while said form is still expanded, releasing said liquid and expelling the same from said inner sleeve by introducing a gas under pressure into the space between said inner and an outer sleeve, releasing said gas and applying a suction to the interior of said form to cause it to collapse, and then withdrawing said form axially from the duct thus formed in said concrete.

5. The process defined in claim 4, wherein auxiliary forms are temporarily bound to the periphery of the inflated duct form which extend to the surface of the completed floor slab to provide access openings to the duct when completed; said auxiliary forms being detached from said inflated duct forms prior to withdrawal of the latter after the concrete has set.

6. A flexible inflatable form for molding cavities in a settable molding material which comprises an expansible central sleeve and at least one surrounding flexible but non-elastic sleeve, said sleeves being closed at their ends and having passages leading to the interiors of at least two of said sleeves to permit communication of fluids to and from said sleeves.

7. An inflatable form as defined in claim 6, which comprises a central sleeve of elastic material, an outer sleeve of flexible material, and an intermediate sleeve of flexible but non-elastic material.

8. An inflatable form as defined in claim 7, which further includes a stepped plug, one end of each of said sleeves being secured to a stepped surface of said plug, and passages through said plug communicating with the interior of said central sleeve and said outer sleeve, respectively, for the communication of fluids to and from said sleeves.

9. A system of forms for molding ducts integrally in a poured concrete floor slab, which system comprises an open center plenum chamber form and a plurality of flexible, tubular, inflatable duct forms extending out from said plenum chamber form; each of said duct forms comprising an expansible central sleeve and at least one surrounding flexible but non-elastic sleeve, said sleeves being closed at their outer ends, the inner ends being passed through, and in snug fit with, apertures in the walls of said plenum chamber form, each of said forms having passages at their respective inner ends which communicate with the interiors of at least two of said sleeves to permit communication of fluids to and from said central and surrounding sleeves.

10. A system of forms for molding ducts as defined in claim 9, wherein adjacent outer ends of at least two of said duct forms are inserted in a rigid hollow coupling member to provide a closed circuit system.

11. A system of forms for molding ducts as defined in claim 10, wherein said duct forms are T-shaped, adjacent outer ends of the legs of such T's being inserted in said rigid hollow coupling members to provide a closed circuit system.

References Cited in the file of this patent

UNITED STATES PATENTS

| | | |
|---|---|---|
| 857,582 | Boyle | June 25, 1907 |
| 857,584 | Boyle | June 25, 1907 |
| 1,130,030 | Sill | Mar. 2, 1915 |
| 1,229,576 | Boyton et al. | June 12, 1917 |
| 1,605,782 | Rota | Nov. 2, 1926 |
| 1,729,356 | Murray | Sept. 24, 1929 |
| 2,116,464 | Mathews | May 3, 1938 |
| 2,156,604 | Payne et al. | May 2, 1939 |
| 2,623,261 | Semeraro | Dec. 30, 1952 |
| 2,646,606 | Easterday | July 28, 1953 |